US010515397B2

(12) United States Patent
Serfass et al.

(10) Patent No.: US 10,515,397 B2
(45) Date of Patent: Dec. 24, 2019

(54) SYSTEM AND METHOD FOR FACILITATING VIRTUAL GIFT GIVING

(71) Applicant: Uptown Network, LLC, Naples, FL (US)

(72) Inventors: John T. Serfass, Naples, FL (US); Nadine M. Serfass, Naples, FL (US); Phil M. Turner, Naples, FL (US)

(73) Assignee: Uptown Network LLC, Naples, FL (US)

( * ) Notice: Subject to any disclaimer, the term of this patent is extended or adjusted under 35 U.S.C. 154(b) by 0 days.

(21) Appl. No.: 16/126,479

(22) Filed: Sep. 10, 2018

(65) Prior Publication Data

US 2019/0080377 A1 Mar. 14, 2019

Related U.S. Application Data

(60) Provisional application No. 62/555,856, filed on Sep. 8, 2017.

(51) Int. Cl.
*G06Q 30/00* (2012.01)
*G06Q 30/06* (2012.01)
(Continued)

(52) U.S. Cl.
CPC ....... *G06Q 30/0603* (2013.01); *G06Q 20/102* (2013.01); *G06Q 20/24* (2013.01); *G06Q 20/322* (2013.01); *G06Q 20/351* (2013.01); *G06Q 20/387* (2013.01); *G06T 17/00* (2013.01); *G06T 19/20* (2013.01); *H04L 67/02* (2013.01); *H04W 4/35* (2018.02); *H04W 4/80* (2018.02)

(58) Field of Classification Search
CPC .......................... G06Q 30/0603; H04W 4/80
USPC ........................................................ 705/26.1
See application file for complete search history.

(56) References Cited

U.S. PATENT DOCUMENTS 9,582,827 B2 * 2/2017 Glass ................. G06Q 30/0643
2011/0164111 A1 * 7/2011 Karaoguz ................ G06F 3/14
348/43

(Continued)

OTHER PUBLICATIONS

Second Life Gift Registry: Bringing Retail Web Applicationsinto the Metaverse, Published in 2008 IEEE Congress on Services, Dept . of Comput. Sci., Univ. of Alberta, Edmonton, AB (Year: 2008).*

*Primary Examiner* — Jeffrey A. Smith
*Assistant Examiner* — Lalith M Duraisamygurusamy
(74) *Attorney, Agent, or Firm* — Brian K. Johnson, Esq., LLC

(57) ABSTRACT

A system for facilitating virtual gifting of goods or services over a communications network includes: a) a first client module configured for purchasing a virtual gift for a recipient, b) a second client module configured for receiving and viewing the purchased virtual gift from the server, over the communications network; c) a third client module configured for receiving a wireless signal for the recipient from the second client module and viewing the purchased virtual gift, and d) a web server module configured for processing electronic payment for the purchased virtual gift with a payment gateway, transmitting the purchased virtual gift to the second client module, and transmitting a confirmation of payment for the purchased virtual gift to a brick and mortar outlet, wherein the purchased virtual gift is configured for redemption at said brick and mortar outlet.

17 Claims, 4 Drawing Sheets

(51) Int. Cl.
  *G06T 17/00*   (2006.01)
  *H04W 4/80*    (2018.01)
  *H04L 29/08*   (2006.01)
  *G06Q 20/24*   (2012.01)
  *G06T 19/20*   (2011.01)
  *H04W 4/35*    (2018.01)
  *G06Q 20/38*   (2012.01)
  *G06Q 20/34*   (2012.01)
  *G06Q 20/10*   (2012.01)
  *G06Q 20/32*   (2012.01)

(56) References Cited

U.S. PATENT DOCUMENTS

| | | | |
|---|---|---|---|
| 2013/0325669 A1* | 12/2013 | Plichta | G06Q 30/0635 705/26.82 |
| 2014/0058873 A1* | 2/2014 | Sorensen | G06F 3/04817 705/26.1 |
| 2014/0066802 A1* | 3/2014 | Kaula | A61B 5/16 600/554 |
| 2016/0014553 A1* | 1/2016 | Cardinal | H04W 4/029 455/456.3 |
| 2016/0232480 A1* | 8/2016 | Erez | G06Q 10/087 |

* cited by examiner

SYSTEM AND METHOD FOR FACILITATING VIRTUAL GIFT GIVING

CROSS-REFERENCE TO RELATED APPLICATIONS

This patent application claims priority to provisional patent application No. 62/555,856 filed on Sep. 8, 2018. The contents of provisional patent application No. 62/555,856 are hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of electronic commerce and, more specifically, the claimed subject matter relates to the field of gifting activities using computing devices.

BACKGROUND

Gift giving is an important part of U.S. commerce. Throughout a typical year, consumers are faced with multiple occasions that require the giving of gifts. Examples include birthdays, graduations, anniversaries, baptisms, holidays, and religious observances. The U.S. Department of Commerce estimates that an average holiday shopping season results in over $500 billion in sales. When all gift giving occasions in an average year are considered, U.S. sales attributed to giving gifts amount to over a trillion U.S. dollars in sales.

Conventionally, gifts are purchased in person by a gift giver and presented to the recipient either personally or via regular mail or courier. In more recent years, with the rise in popularity of the Internet, gift givers are increasingly purchasing gifts online and having the gifts shipped to the recipient. A less common option is to have a third person, such as a personal shopper, purchase a gift on behalf of a gift giver and present the gift to the recipient. Thus, a variety of ways exist for purchasing gifts and relaying them to the recipient of the gift.

One of the drawbacks associated with conventional gift giving activities involves the time gap and location disparity between the purchase of the gift and the presentation of the gift to the gift recipient. Conventionally, a gift giver purchases a gift at a brick and mortar store and then physically transports the gift for presentation to the gift recipient at a later time. When the Internet is used, a gift giver purchases a gift on a web site and then a delivery provider or courier physically delivers the gift to the gift recipient at a later time. The time gap and the disparity in location between the time/location of purchase of the gift and the time/location the gift is presented can take away from the impact of the gift and its utility to the gift recipient. This can be a disadvantage in situations where the gift is meant to be relevant at the time of purchase or meant to be used or enjoyed at or near the time of purchase.

Therefore, what is needed is a system and method for improving the problems with the prior art, and more particularly for a more expedient and efficient method and system for facilitating gift giving activities.

BRIEF SUMMARY

In one embodiment, a system for facilitating virtual gifting of goods or services over a communications network is disclosed. The system includes: a) a first client module executing on a first client computing device communicably connected to a communications network, the first client module configured for: 1) transmitting a request to a web server to view one or more virtual gifts, over the communications network, wherein a virtual gift comprises: i) a 3D model of a real object, ii) on which a set of actions may be performed, iii) wherein the virtual gift is configured for redemption at a brick and mortar outlet; 2) viewing one or more virtual gifts received from the server in response to the request, over the communications network; 3) executing one or more actions upon the one or more virtual gifts received from the server; and 4) transmitting an electronic payment for a selected virtual gift, and a unique identifier for a recipient, to the web server, over the communications network.

The system also includes: b) a second client module executing on a second client computing device associated with a recipient, the second client computing device communicably connected to the communications network, the second client module configured for: 1) receiving the selected virtual gift from the server, over the communications network; 2) viewing the selected virtual gift received from the server; 3) executing one or more actions upon the selected virtual gift received from the server; and 4) instructing the second client computing device to transmit a wireless signal including a unique identifier for the recipient.

The system also includes: c) a third client module executing on a third client computing device communicably connected to the communications network, the third client module configured for: 1) receiving a wireless signal including the unique identifier for the recipient from the second client computing device; 2) transmitting a request including the unique identifier for the recipient to the web server, over the communications network; 3) viewing the selected virtual gift received from the server, over the communications network, in response to the request; and 4) executing one or more actions upon the selected virtual gift received from the server.

The system also includes: d) a database communicably connected to the communications network, the database configured for storing one or more virtual gifts, wherein a virtual gift comprises: i) a 3D model of a real object, ii) on which a set of actions may be performed, iii) wherein the virtual gift is configured for redemption at a brick and mortar outlet; and e) a web server module executing on a web server communicably connected to the communications network, the web server module configured for: 1) receiving the request to view one or more virtual gifts from the first client module, over the communications network; 2) transmitting one or more virtual gifts to the first client module, over the communications network; 3) receiving the electronic payment for the selected virtual gift, and the unique identifier for the recipient, from the first client module, over the communications network; 4) processing the electronic payment for the selected virtual gift with a payment gateway, over the communications network; 5) transmitting the selected virtual gift to the second client module using the unique identifier for the recipient, over the communications network; and 6) transmitting a confirmation of payment for the selected virtual gift to a brick and mortar outlet, over the communications network, wherein the selected virtual gift is configured for redemption at said brick and mortar outlet.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

The disclosed embodiments improve upon the problems with the prior art by providing a system that allows a friend (i.e., the gift giver) of a user (i.e., the gift recipient) that is currently present at a location to purchase a gift for that user at the location, without requiring that the gift giver is present at the location. The gift giver may purchase a gift, such as a food item, or a service, such as a massage, for the gift recipient online using his computing device, which results in the gift recipient receiving a virtual gift on his mobile device or mobile virtual reality/augmented reality (VR/AR) system, which may be redeemed at the location for the actual gift. Therefore, the disclosed embodiments reduce or eliminate the need for the purchasing friend to be present at the recipient's location in order to give a gift to the recipient at the location. This is advantageous for users and their friends, as it provides greater flexibility in gift giving activities and bridges the temporal and geographic gap that may exist between a user at a remote location and a friend at home, who desires to give a gift to the user. An additional benefit of the disclosed embodiments is the immediate transmission of the virtual gift to the recipient's mobile device, which allows the recipient to virtually experience the actual gift that shall be redeemed at the location. The main benefit of the claimed subject matter is the improvement of the conventional gift giving experience. That is, gift giving a virtual gift card, for example, is more personal, engaging and inviting than a conventional paper or plastic gift card. The claimed subject matter allows for the giving of the benefits of a real gift card while maintaining the experience of an actual gift.

Figure 1:
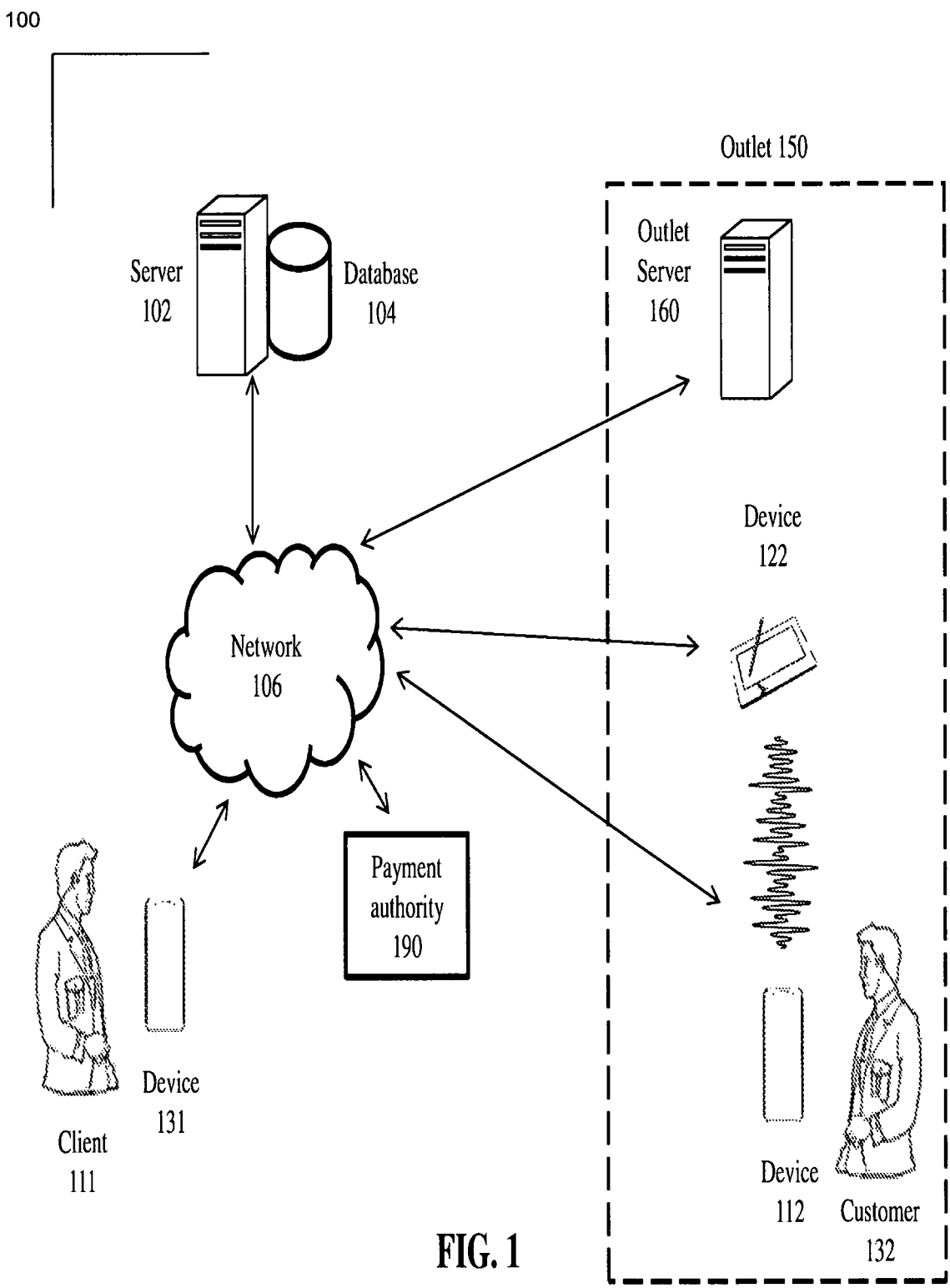
FIG. 1 is a block diagram illustrating the network architecture of a system for facilitating gifting of virtual goods or services over a communications network, in accordance with one embodiment.

Referring now to the drawing figures in which like reference designators refer to like elements, there is shown in FIG. 1 an illustration of a block diagram showing the network architecture of a system 100 and method for facilitating virtual gift giving activities over a communications network in accordance with one embodiment. A prominent element of FIG. 1 is the server 102 associated with repository or database 104 and further communicatively coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for functionality of the disclosed embodiments, namely, facilitating gift giving activities between users.

FIG. 1 includes mobile computing devices 131, 112 and 122, which may be smart phones, mobile phones, tablet computers, handheld computers, laptops, or the like. In another embodiment, mobile computing devices 131, 112 and 122, are workstations, desktop computers, servers, laptops, all-in-one computers, or the like. In another embodiment, mobile computing devices 131, 112 and 122, are AR or VR systems that may include display screens, headsets, heads up displays, helmet mounted display screens, tracking devices, tracking lighthouses or the like. Mobile computing device 112 corresponds to a customer 132 of a brick and mortar store, service provider or outlet 150, such as a restaurant. Mobile computing device 122 corresponds to the brick and mortar store, service provider or outlet 150. Mobile computing device 131 corresponds to a friend, a family member or acquaintance 111 of customer 132. The term friend is used loosely to designate any other person in relation to the customer 132. FIG. 1 also shows a server, computer or mobile computing device 160 corresponding to the brick and mortar store, service provider or outlet 150. Devices 160, 131, 112 and 122 may be communicatively coupled with network 106 in a wired or wireless fashion. Augmented reality (AR) adds digital elements to a live view often by using a camera on a computing device. Virtual reality (VR) is a complete or near complete immersion experience that replaces the physical world.

FIG. 1 further shows that server 102 includes a database or repository 104, which may be a relational database comprising a Structured Query Language (SQL) database stored in a SQL server. Devices 160, 131, 112 and 122 may also each include their own database. The repository 104 serves data from a database, which is a repository for data used by server 102 and devices 160, 131, 112 and 122 during the course of operation of the disclosed embodiments. Database 104 may be distributed over one or more nodes or locations that are connected via network 106.

The database 104 may include a user record for each user 111 or 132. A user record may include: contact/identifying information for the user (name, address, telephone number(s), email address, etc.), information pertaining to virtual gifts associated with the user, contact/identifying information for friends of the user, electronic payment information for the user, information pertaining to the purchases made by the user, sales transaction data associated with the user, etc. A user record may also include a unique identifier for each user, a residential address for each user, the current location of each user (based on location-based services from the user's mobile computer) and a description of past virtual gifts purchased by each user. A user record may further include demographic data for each user, such as age, sex, income data, race, color, marital status, etc. A user record may also include contact information (email address, name, address, telephone number, etc.) or a unique identifier for one or more friends or acquaintances of the user.

Sales transaction data may include one or more product/service identifiers (such as SKUs), one or more product/service amounts, buyer contact/identifying information, brick and mortar outlet information, and electronic payment information. In one embodiment, electronic payment information may comprise buyer contact/identifying information and any data garnered from a purchase card (i.e., purchase card data), as well as any authentication information that accompanies the purchase card. Purchase card data may comprise any data garnered from a purchase card and any authentication information that accompanies the purchase card. In one embodiment, electronic payment information may comprise user login data, such as a login name and password, or authentication information, which is used to access an account that is used to make a payment.

The database 104 may include a virtual gift record for each virtual gift. A virtual gift comprises: i) a 3D model of a real object, ii) on which a set of actions may be performed, and iii) wherein the virtual gift is configured for redemption at a brick and mortar outlet. A virtual gift is a virtual representation of a real object, such as a bottle of wine or a fancy dessert, that is meant to be redeemed at a brick and mortar outlet, such as a restaurant. A 3D model is a mathematical representation of the physical object in three dimensions using a collection of points in 3D space, connected by various geometric entities such as triangles, lines, curved surfaces, etc. A 3D model may be displayed as a two-dimensional image on a display screen through a process called 3D rendering.

The set of actions that may be performed on the 3D model include viewing the 3D model in two dimensions (3D rendering), rotating the 3D model, resizing the 3D model, manipulating the 3D model, changing the color or other characteristics of the 3D model, changing the viewer's perspective in relation to the 3D model, etc. The set of actions may include interactive manipulation of the 3D model via a display screen on a client computing device, such as those defined above. The set of actions that may be performed on the 3D model may be performed by the device of the user, which may be a VR or AR system.

The set of actions that may be performed on the 3D model may also include engaging in an action that involves the 3D model, such as unwrapping gift wrap that surrounds the 3D model, viewing the 3D model in an environment that represents the brick and mortar outlet in which the virtual gift will be redeemed, or viewing the 3D model in a location related to the virtual gift, such as the winery associated with a bottle of wine that comprises the virtual gift. Another action may be watching the virtual gift actually being delivered in virtual space. The set of actions that may be performed on the 3D model may also include virtual walls opening up and the virtual gift flying in, for example. In another embodiment, the set of actions that may be performed on the 3D model may also include the user being surrounded by a completely different environment when viewing through their device—perhaps being within the restaurant or visiting a vineyard in the case of the virtual gift being a wine bottle. The set of actions that may be performed on the 3D model may be performed by the VR or AR system of the user.

A virtual gift record may include the 3D model of the object represented by the virtual gift, the set of actions that may be performed on the 3D model, and an identifier for the brick and mortar outlet wherein the virtual gift is configured for redemption. A virtual gift record may also include: a unique virtual gift identifier, contact/identifying information for the recipient user associated with the virtual gift and/or the giver who purchased the virtual gift, a description of goods or services that may be redeemed with the virtual gift, an amount of goods or services that may be redeemed, an amount of money that was paid for the virtual gift, a monetary redemption amount for the virtual gift, brick and mortar outlet information (such as address, phone number, web site, etc.), date and time data, and a data element that indicates whether the virtual gift has been used or redeemed. In another embodiment, a virtual gift record may include a unique code for each virtual gift. A virtual gift is defined as a representation of the corresponding virtual gift record, which may reside on a mobile computing device of a user. In one embodiment, a virtual gift is a file or other data structure which may reside on the mobile device of a user, wherein, when opened or activated, displays data of a virtual gift record.

FIG. 1 shows an embodiment wherein networked computing devices 131, 112, 122, 160 interact with server 102 and repository 104 over the network 106. It should be noted that although FIG. 1 shows only the networked computers 131, 112, 122, 160 and 102, the system of the disclosed embodiments supports any number of networked computing devices connected via network 106. Further, server 102, and units 131, 112, 122, 160 include program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 131, 112, 122, 160. Further, server 102 and its functionality, according to a preferred embodiment, can be realized in a centralized fashion in one computer system or in a distributed fashion wherein different elements are spread across several interconnected computer systems.

FIG. 1 also shows a payment authority 190, which acts to effectuate payments by users 111 or 132 for virtual gifts, or the like. In the course of a sales transaction, server 102 may interface with payment authority 190 to effectuate payment. In one embodiment, the payment authority 190 is a payment gateway, which is an e-commerce Application Service Provider (ASP) service that authorizes and processes payments from one party to another. The payment authority 190 may accept payment via the use of purchase cards, i.e., credit cards, charge cards, bank cards, gift cards, account cards, etc.

FIG. 1 also shows a brick and mortar outlet 150, which represents the physical presence of an organization or business in a building or other structure. The outlet 150 may be a retail store, a restaurant, a cafeteria, a music venue, a sports venue, a theater, an arena, a stage, an amphitheater, an outdoor concert structure, stadium, bandshell, bandstand, concert hall, opera house, nightclub, discotheque, park, bar, pub, sports complex, etc. The outlet server 160 may also represent the information technology infrastructure, including servers and computers, which are used by the brick and mortar outlet 150 to manage virtual gifts.

Figure 2:
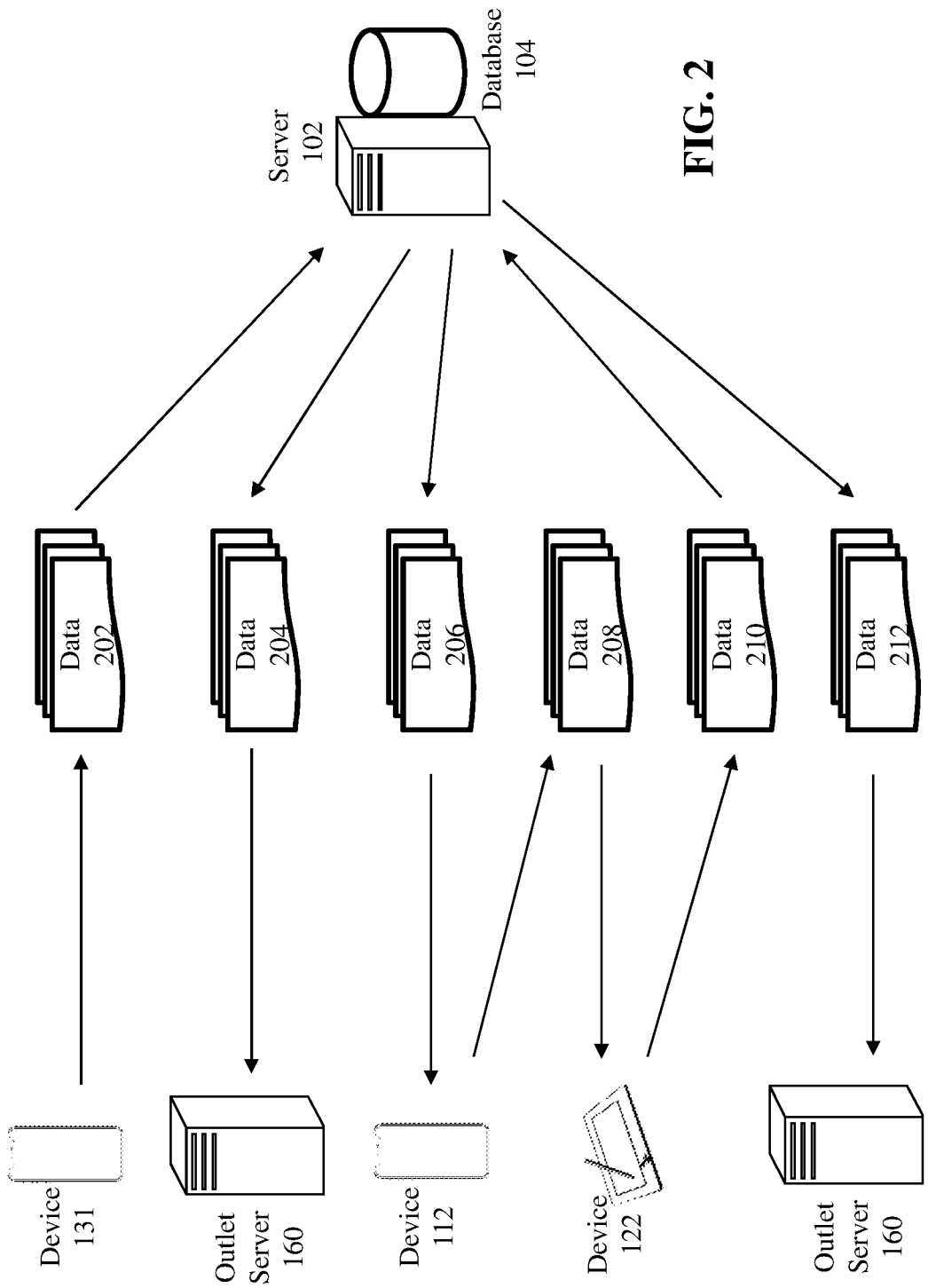
FIG. 2 is a block diagram showing the data flow of the process for gifting of virtual goods or services over a communications network, according to one embodiment.
Figure 3:
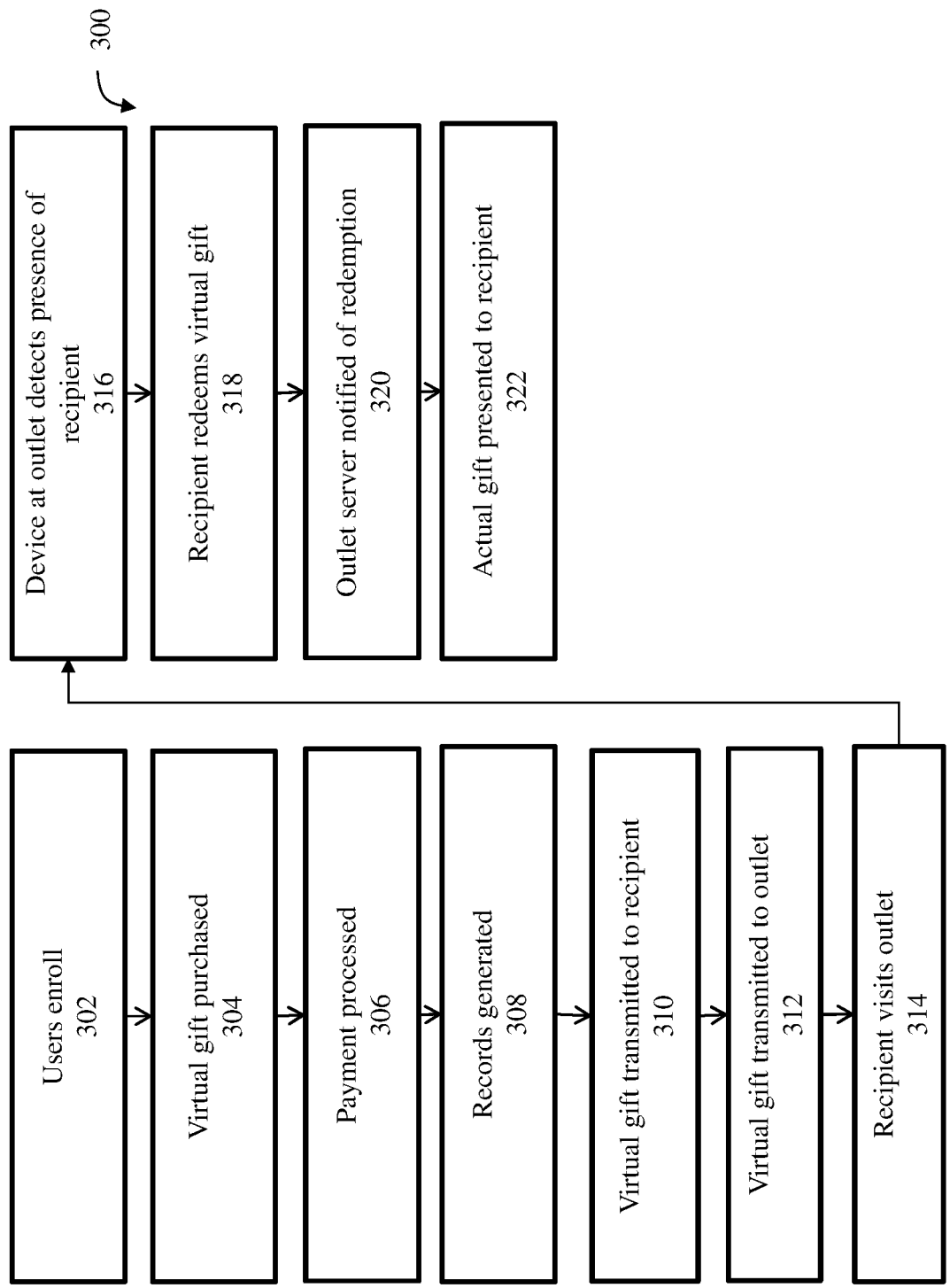
FIG. 3 is a flow chart depicting the general control flow of a process for facilitating gifting of virtual goods or services over a communications network, according to one embodiment.

The process of virtual gift giving over a communications network will now be described with reference to FIGS. 2-3 below. FIGS. 2-3 depict the data flow and control flow of the process for facilitating virtual gift giving over a communications network 106, according to one embodiment. The process of the disclosed embodiments begins with optional step 302 (see flowchart 300), wherein the users 111 and 132 may enroll or register with server 102. In the course of enrolling or registering, the users may enter data into their device by manually entering data into a mobile application via keypad, touchpad, or via voice. In the course of enrolling or registering, the users may enter any data that may be stored in a user record, as defined above. Also in the course of enrolling or registering, the server 102 may generate a user record for each registering user and store the user record in an attached database, such as database 104.

Subsequently, in step 304, the user 111 purchases a virtual gift for his friend 132 for redemption at brick and mortar outlet 150. The user 111 may purchase the virtual gift utilizing a client module executing on his mobile computing device 131. The client module is configured for transmitting a request (via data packet 202), such as an HTTP request, to server 102 to view one or more virtual gifts, viewing one or more virtual gifts received from the server in response to the request, executing one or more actions upon the one or more virtual gifts received from the server 102 and transmitting an electronic payment for a selected virtual gift, and a unique identifier (such as an email address, a name, a phone number, etc.) for the recipient 132, to the server 102. The client module may view virtual gifts using a VR or AR system.

In step 306, electronic payment information presented by the user 111 when purchasing the virtual gift is transmitted by server 102 to payment authority 190 for processing. The payment authority 190 processes the electronic payment information and verifies whether payment has been effectuated. If so, the payment authority 190 may send a verification message to the server 102 thereby verifying that the payment has been effectuated.

In the next step 308, the server 102 may generate and store in database 104 one or more virtual gift records for the virtual gift purchased by the user 111. Also in step 308, the server 102 may generate a unique code for the virtual gift purchased. The unique code for the virtual gift purchased may be stored in the corresponding record for that the virtual gift.

In 310, the server 102 may transmit the purchased virtual gift, or any portion thereof, (via data packet 206) to the mobile device 112 of the user 132: 1) via a network protocol, such as HTTP, to the IP address of the mobile device 112, as the IP address is stored in the user record(s) associated with the purchased virtual gift or the user record of the user 132, or 2) via text message to the telephone number of the mobile device 112 of the user 132, as the telephone number is stored in the user record(s) associated with the purchased virtual gift or the user record of the user 132. Once it has received the virtual gift, or any portion thereof, from the server, the client module executing on mobile computing device 112 may view the virtual gift and execute one or more actions upon the virtual gift. In step 312, the server 102 may transmit the purchased virtual gift, or any portion thereof, (via data packet 204) to the outlet server 160, as well as a confirmation of payment for the virtual gift. The client module executing on mobile computing device 112 may view virtual gifts using a VR or AR system.

In step 314, the customer 132 attends or physically visits the outlet 150. In this step, the client module executing on mobile computing device 112 may instruct the computing device to transmit a wireless signal (such as a low power Bluetooth signal or Bluetooth Low Energy) including a data packet 208 that holds a unique identifier for the recipient or customer 132. The data packet 208 may include any data included in the user record for the user 132 or the virtual gift record for the purchased virtual gift.

In step 316, the client module executing on mobile computing device 122 receives the wireless signal including the unique identifier for the recipient 132 from the client computing device 112, and the device 122 transmits a request (in data packet 210) including the unique identifier for the recipient to the server 102. The server 102 responds to the request by sending the purchased virtual gift to the device 122. Once it has received the virtual gift, or any portion thereof, from the server, the client module executing on mobile computing device 122 may view the virtual gift and execute one or more actions upon the virtual gift. The client module executing on mobile computing device 122 may view virtual gifts using a VR or AR system. In one embodiment, the claimed subject matter does not necessitate the existence of device 122, and the process of having device 112 transmitting a signal to device 122 is not required. In that embodiment, steps 314 and 316 are modified accordingly.

In step 318, the user 132 may interact with the client module executing on mobile computing device 112 to order or redeem the virtual gift at the outlet 150. In optional step 320, the server 102 may send a notice (in data packet 212) to the outlet server 160 indicating that the user 132 intends to redeem his virtual gift. In step 322, the actual or real gift represented by the virtual gift is presented to the user 132 in reality. Note that the actual or real gift presented to the user 132 in reality is visually identical or near-identical to the virtual gift that was given to the user 132.

Figure 4:
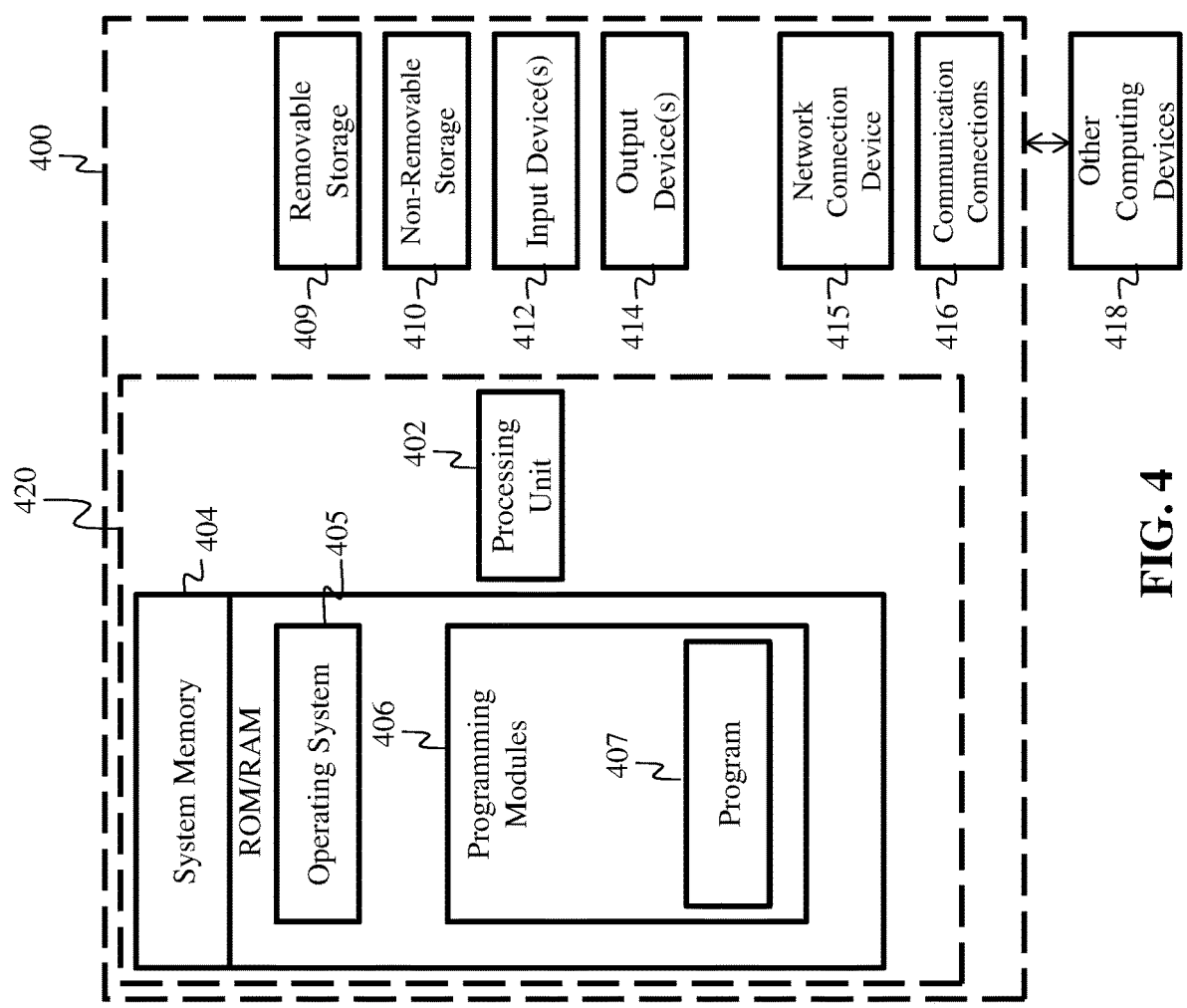
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 131, 112, 122, 160, 102 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and process 300, as described above. Process 300 may operate in other environments and are not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of 131, 112, 122, 160, 102. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the process 300 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for facilitating virtual gift giving, said system comprising:

a) a first client module executing on a first client computing device associated with a gift sender communicably connected to a communications network, said first client module configured for:
  1) transmitting a request to a web server to view one or more virtual gifts, over said communications network, wherein each virtual gift comprises:
    i) a 3D model of a real object;
    ii) on which a set of actions may be performed; and
    iii) wherein said virtual gift is configured for redemption at a brick and mortar store for a real gift represented by said 3D model;
  2) viewing on a screen on said first client computing device said one or more virtual gifts received from said web server in response to said request, over said communications network;
  3) executing one or more actions upon said one or more virtual gifts received from said server, said executing including selecting a particular virtual gift; and
  4) transmitting an electronic payment for said selected virtual gift and a unique identifier corresponding to a recipient, to said web server, over said communications network;
b) a second client module executing on a second client computing device associated with said recipient, said second client computing device communicably connected to said communications network, said second client module configured for:
  1) receiving said selected virtual gift from said web server, over said communications network;
  2) viewing on a screen on said second client computing device said selected virtual gift received from said server;
  3) executing one or more actions upon said selected virtual gift received from said server; and
  4) instructing said second client computing device to transmit a wireless signal to said communications network including said unique identifier for said recipient;
c) a third client module executing on a third client computing device associated with said brick and mortar store communicably connected to said communications network, said third client module configured for:
  1) receiving said wireless signal transmitted over said communications network including said unique identifier for said recipient from said first client computing device and second client computing device;
  2) transmitting a request including said unique identifier for said recipient to said web server, over said communications network;
  3) viewing on a screen on either of said second client computing device or said third client computing device said selected virtual gift received over said communications network, in response to said transmitted request from said third client module, said second or said third computing device on which said selected virtual gift is viewed being coupled to a virtual reality system for viewing said 3D model of said selected virtual gift within said brick and mortar store at which said virtual gift is redeemed and for which a real gift corresponding to said selected virtual gift and said 3D model is provided to said recipient, and
  4) executing one or more actions upon said selected virtual gift viewed as said 3D model and received from said web server, said set of actions including at least one of:
    i) viewing said 3D model;
    ii) rotating said 3D model;
    iii) resizing said 3D model;
    iv) manipulating said 3D model;
    v) changing a characteristic of said 3D model;
    vi) changing the perspective view of said 3D model;
    vii) opening packaging used on said 3D model of said selected virtual gift;
d) a database communicably connected to said communications network, said database configured for storing said one or more virtual gifts, and;
e) a web server module executing on said web server communicably connected to said communications network, said web server module configured for:
  1) receiving from said first client module over said communications network said request to view one or more virtual gifts;
  2) transmitting over said communications network one or more virtual gifts to said first client module;
  3) receiving from said first client module over said communications network said electronic payment for said selected virtual gift and said unique identifier for said recipient;
  4) processing said electronic payment for said selected virtual gift with a payment gateway, said payment gateway coupled to said communications network;
  5) transmitting over said communications network said selected virtual gift to said second client module using said unique identifier for said recipient; and
  6) transmitting over said communications network a confirmation of payment for said selected virtual gift to said brick and mortar store wherein said confirmation makes said selected virtual gift available for redemption at said brick and mortar store.

2. The system of claim 1, wherein said step of transmitting said request to said web server further comprises transmitting an HTTP request to said web server.

3. The system of claim 1, wherein said first computing device is coupled to a virtual reality system for viewing said selected virtual gift and 3D model, said step of viewing one or more virtual gifts received from said server further comprises viewing one or more virtual gifts via said display screen on said first client computing device using said virtual reality system.

4. The system of claim 1, wherein said step transmitting said electronic payment for said selected virtual gift, and said unique identifier for said recipient further comprises transmitting credit card information for said selected virtual gift and an email address associated with said recipient.

5. The system of claim 1, wherein said step of instructing said second client computing device to transmit said wireless signal further comprises transmitting a low power Bluetooth signal.

6. The system of claim 5, wherein the step of receiving said wireless signal over said communications network by said third computing device, includes receiving at said third computing device a low power Bluetooth signal from said communications network including said unique identifier.

7. The system of claim 6, wherein said step of transmitting a request by said second computing device including said unique identifier for said recipient further comprises transmitting an HTTP request including said unique identifier for said recipient.

8. The system of claim 1 wherein said communications network is an entirely wireless communications network.

9. The system of claim 1 wherein said virtual reality system includes an augmented reality sub-system.

10. The system of claim 1 wherein said unique identifier associated with said recipient and transmitted by said first and second client modules are different.

11. The system of claim 1 wherein said selected virtual gift is a bottle of wine and said brick and mortar store is a vineyard winery.

12. The system of claim 1 wherein said selected virtual gift is a gift card.

13. A method of facilitating virtual gift giving using a gifting system, said gifting system including a first client module executing on a first client computing device associated with a gift sender, a second client module executing on a second client computing device associated with a recipient, a third client module executing on a third client computing device associated with a brick and mortar store, a database for storing one or more virtual gifts, a web server module executing on a web server, each of said first, second and third client computing devices, said database and said web server communicably connected to a communications network wherein all transmission between said devices takes place over said communications network, each of said first, second and third client computing devices having a screen, either one or both of said second and third client computing devices includes a virtual reality system coupled to said second and third client computing devices respectively and used to view said one or more virtual gifts; said virtual gift comprising i) a 3D model of a real object; ii) on which a set of actions may be performed; and iii) wherein said virtual gift is available for redemption at a brick and mortar store for a real gift represented by said 3D model, said set of actions including at least one of: a) viewing said 3D model; b) rotating said 3D model; c) resizing said 3D model; d) manipulating said 3D model; e) changing a characteristic of said 3D model; f) changing the perspective view of said 3D model; g) opening packaging used on said 3D model of said selected virtual gift, the method comprising:

transmitting by said first client module a request to said web server to view said one or more virtual gifts;

receiving by said web server module said request to view one or more virtual gifts from said first client module;

accessing by said web server module said database and transmitting by said web server module said one or more virtual gifts to said first client module;

viewing on said screen of said first client computing device said one or more virtual gifts received from said web server module in response to said request;

executing on said first client computing device one or more actions of said set of actions by said sender upon said one or more virtual gifts received from said web server module, said step of executing including selecting a particular virtual gift;

transmitting by said first client module an electronic payment for said selected virtual gift and a unique identifier for said recipient, to said web server;

receiving by said web server module said electronic payment for said selected virtual gift, and said unique identifier for said recipient from said first client module;

processing by said web server module said electronic payment for said selected virtual gift using a payment gateway;

transmitting with said web server module said selected virtual gift to said second client computing device using said unique identifier for said recipient;

transmitting with said web server module a confirmation of payment for said selected virtual gift to said brick and mortar store over said communications network, whereby said selected virtual gift is made available for redemption at said brick and mortar store;

receiving with said second client module said selected virtual gift from said web server module;

viewing on said screen of said second client computing device said selected virtual gift received from said web server module;

executing on said second computing device one or more actions within said set of actions upon said selected virtual gift received from said server;

instructing said second client module to transmit a wireless signal including said unique identifier for said recipient;

receiving with said third computing module said wireless signal transmitted over said communications network including said unique identifier for said recipient from said first client computing device and said second client computing device;

transmitting a request by said third computing device including said unique identifier for said recipient to said web server; and viewing on a screen on either of said second client computing device or said third client computing device said selected virtual gift received in response to said request, said selected virtual gift being viewed using said virtual reality system coupled to said respective viewing client computing device, said viewing taking place within said brick and mortar store at which said virtual gift is redeemed and for which a real gift corresponding to said virtual gift is provided to said recipient, the step of viewing including executing one or more actions within said set of actions upon said selected virtual gift viewed as a 3D model.

14. The method of claim 13 wherein said first computing device also includes a virtual reality system coupled to said first client module for viewing said one or more virtual gifts and associated 3D model, the method further comprising:

viewing on a screen on said first client computing device said selected virtual gift received, said selected virtual gift being viewed using said virtual reality system, the step of viewing including executing one or more actions within said set of actions upon said selected virtual gift viewed as said 3D model.

15. The method of claim 13 wherein said viewing second or third computing device includes a camera as part of said virtual reality systems, the method further comprising:

viewing on said screen on said first client computing device said redemption of said selected virtual gift by said recipient at said brick and mortar store using said camera.

16. The method of claim 13 wherein said first computing device also includes a virtual reality system coupled to said first computing device for viewing said one or more virtual gifts as a 3D model, the method further comprising:

viewing on said screen on said first client computing device using said associated virtual reality system said selected virtual gift simultaneously as it is being viewed using said virtual reality system associated with at least one of said second or third computing devices as said viewing takes place within said brick and mortar store at which said virtual gift is redeemed.

17. The method of claim 13 further comprising:
transmitting a notice from said second client module to said third computing device, said notice indicating an intention of said recipient to redeem said selected virtual gift.

\* \* \* \* \*